G. FEDCHENKO.
AEROPLANE.
APPLICATION FILED JAN. 2, 1918.

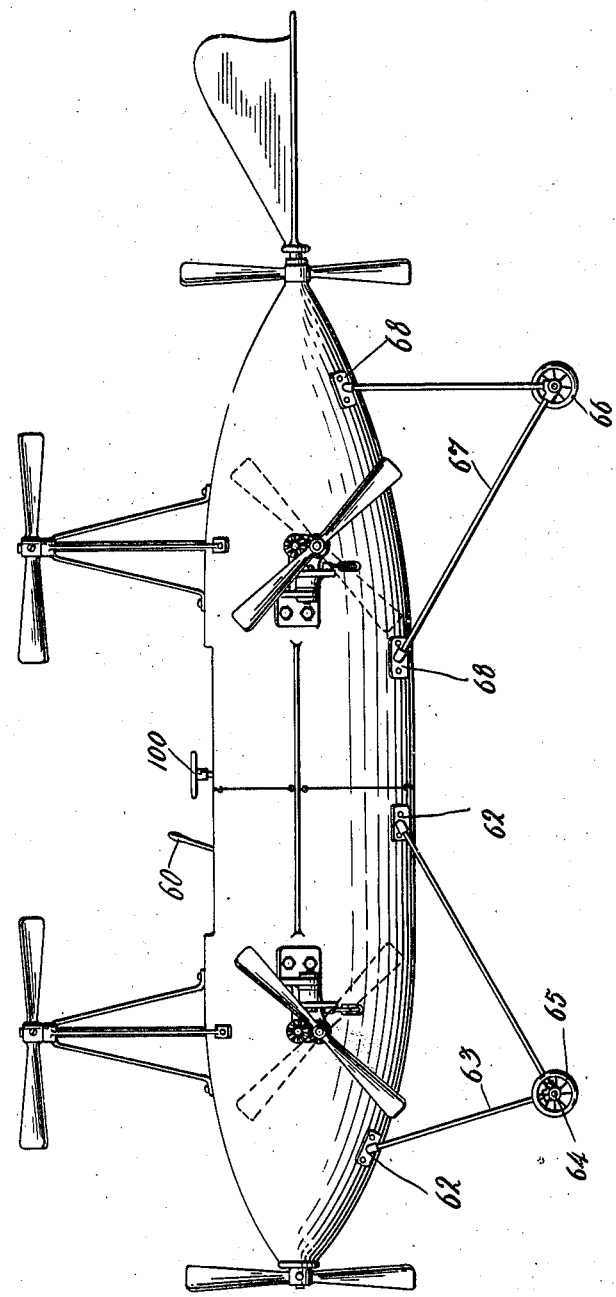

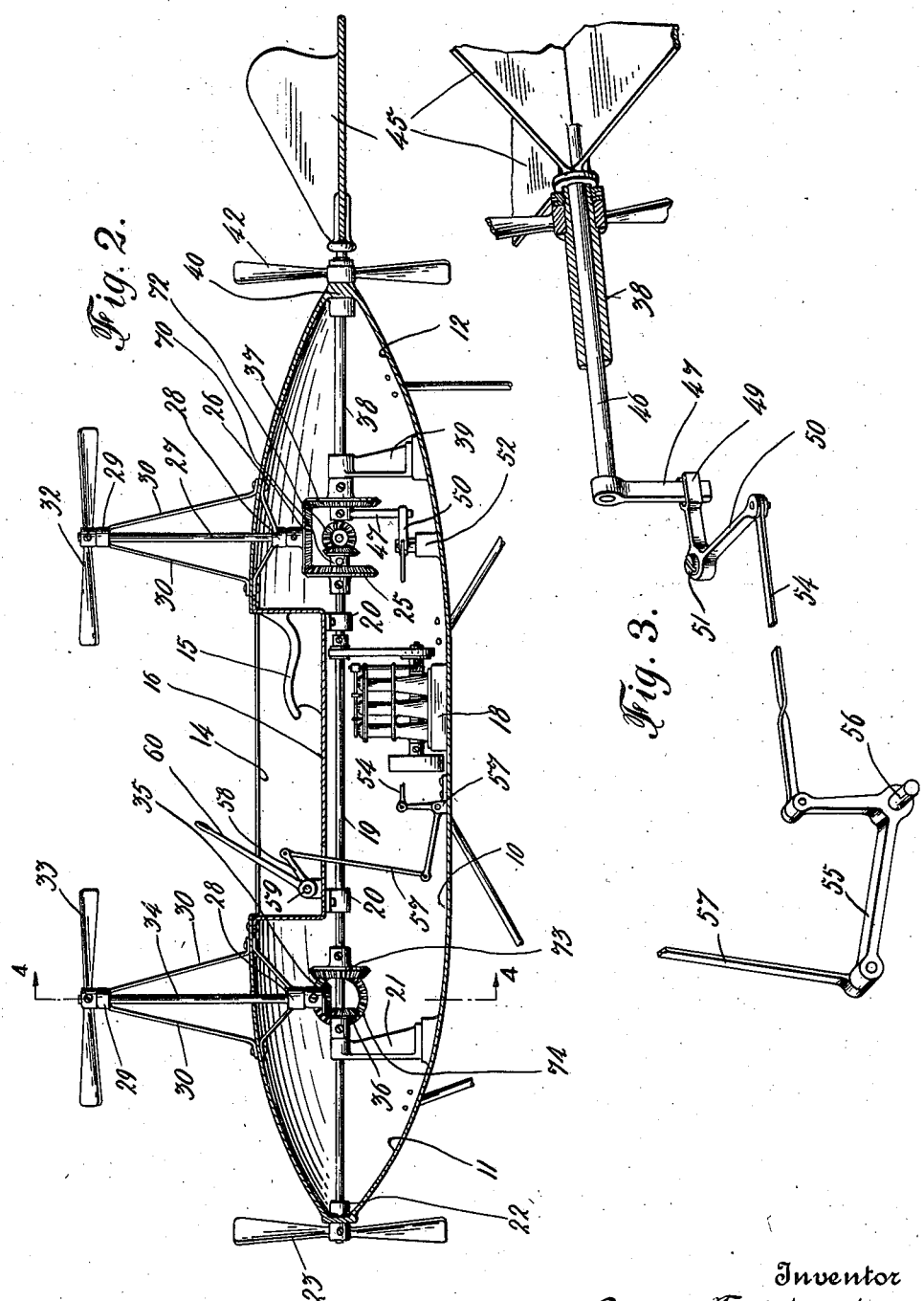

1,277,206.

Patented Aug. 27, 1918.
3 SHEETS—SHEET 3.

INVENTOR.
BY his George Fedchenko.
Oscar Geier
ATTORNEY

UNITED STATES PATENT OFFICE.

GEORGE FEDCHENKO, OF DETROIT, MICHIGAN.

AEROPLANE.

1,277,206.  Specification of Letters Patent.  Patented Aug. 27, 1918.

Application filed January 2, 1918. Serial No. 209,935

*To all whom it may concern:*

Be it known that I, GEORGE FEDCHENKO, a citizen of Russia, resident of Detroit, county of Wayne, and State of Michigan, have invented certain new and useful Improvements in Aeroplanes, of which the following is a specification.

This invention relates to improvements in flying machines, particularly to "heavier than air" types, and the principal object of the invention is to provide a flying machine which may be readily navigated in any direction, lengthwise or sidewise, and caused to rise in the air, by propellers arranged in the manner of helicopters, means being provided whereby the side propellers may be turned upwardly to effect this purpose.

A further object is to provide the machine with a rudder to direct the same laterally, and with landing wheels rigidly engaged with the main frame.

These and other like objects are attained by the novel construction and combination of parts hereinafter described, and shown in the accompanying drawings, and in which:

Figure 1 is a side elevational view of an air-ship made in accordance with the invention.

Fig. 2 is a vertical sectional view taken on line 2—2 of Fig. 4.

Fig. 3 is an enlarged fragmental perspective view showing the operative connections to the rudder.

Figure 4:
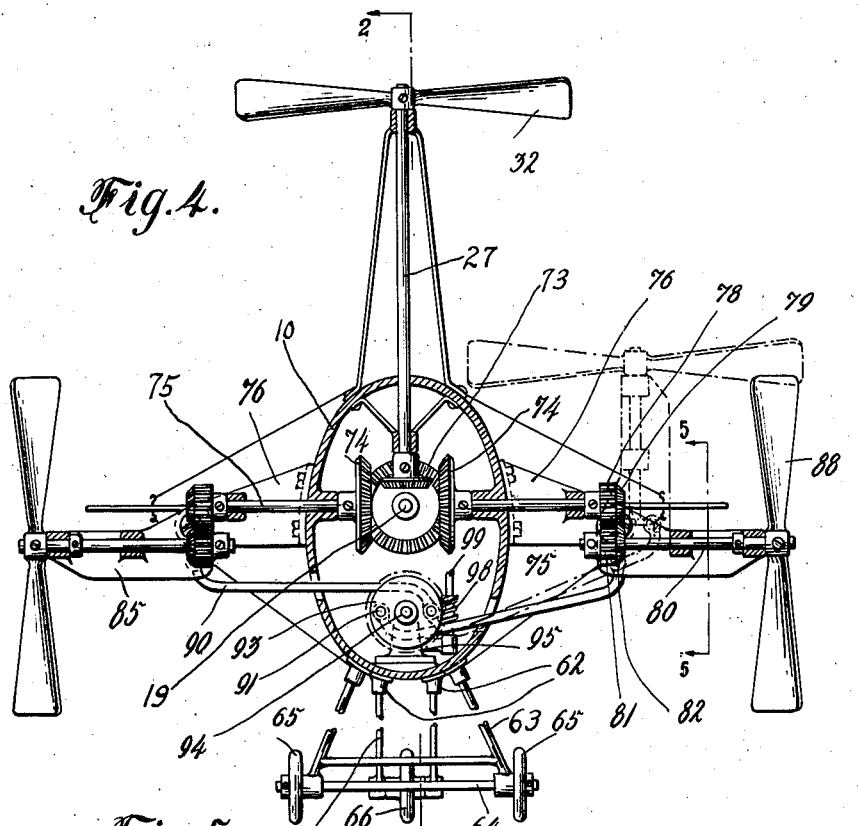
Fig. 4 is a vertical sectional view taken on line 4—4 of Fig. 2.
Figure 5:
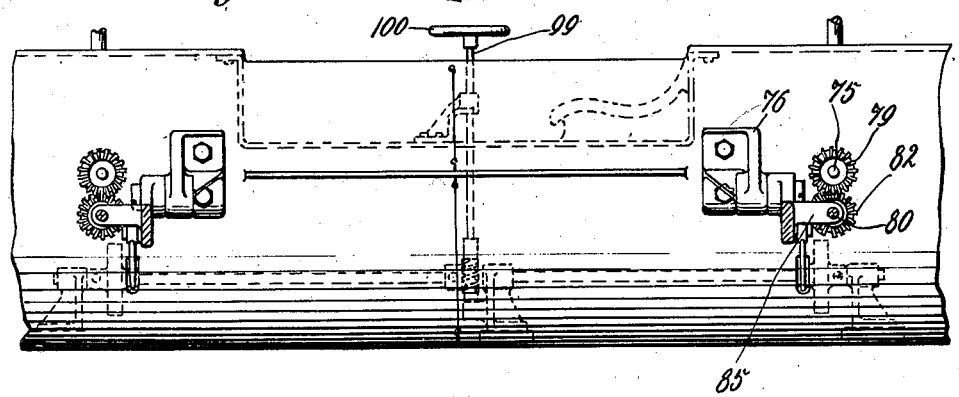
Fig. 5 is an enlarged vertical sectional view taken on line 5—5 of Fig. 4.

In carrying out this invention use is made of a substantially cylindrical casing or frame 10, having conoidal ends 11 and 12, respectively at the front and rear, and a central inclosed space 14 at its upper side in which is a seat 15 for the operator.

A motor 18 is arranged centrally of the casing, below the platform 16, the same, by suitable transmission means operating an axial shaft 19, guided in bearings 20, secured to the platform 16, other bearings 21 being secured within the conical end 11, the shaft passing through the front element 11 of the casing, where a bearing 22 is provided, the extending end having secured to it a propeller 23.

The rear end of the shaft 19, adjacent to the bearing 20, has engaged upon it a bevel gear 25, connecting with a mating gear 26, secured upon the vertical shaft 27, supported in bearings 28 and 29, the latter being secured to supports 30 extending upward from the upper side of the casing, the shaft having upon it a propeller 32, while at the front is a similar propeller 33, mounted on a shaft 34 carried in like brackets.

The front shaft is driven through a bevel gear 35, engaging with a mating gear 36, the hub of which is held in relation to the front support 21. Driven by the gear 26, is another gear 37 on the end of a tubular shaft 38 journaled in the rear bearing 39 and extending through the bearing 40 at the stern of the float where it has attached a propeller 42, which by reason of the gear-train, operates in a reverse direction from that of the front propeller 23.

A three bladed tail plane 45 is attached to the end of a shaft 46, which is operable within the propeller shaft 38 and has at its front end, an arm 47, extending downward through the forks 49 of a bell-crank lever 50, pivoted on a pin 51 in the bracket 52, secured to the inner wall of the casing. The long arm of the bell-crank lever has pivotally engaged therewith a link 54 engaged with the short arm of a corresponding bell-crank lever 55 journaled on a pin 56, carried in the bracket 57 also attached to the interior of the casing 10, and having its longer arm engaged with a pivoted link 57, the same extending upward through the opening in the platform 16, and connecting with a lever 58, mounted on a shaft 59 alongside of which is rigidly engaged a hand operating lever 60, which when moved forward and back obviously, through the combined links and levers, causes the rudder 45 to partially rotate.

On the lower side of the casing 10 are pads 62, engaging with angularly disposed frame elements 63 in which is mounted a shaft 64 carrying a pair of landing wheels 65, a similar but single landing wheel 66, being supported by the frame elements 67 engaged by pads 68 to the rear portion of the car.

On the shaft 19, is secured a bevel gear 70 meshing with a pair of mating gears 72 on shafts extending outwardly on opposite sides from the casing, while at the front is another gear 73 secured to the shaft 19, driving a pair of gears 74, on horizontal outwardly extending shafts 75 supported in out-board brackets 76, the shafts terminating in spur gears 78, having bevel gears 79 combined with their outer sides.

Also carried in the shaft bearing 76, are other shafts 80 having spur gears 81 meshing with the spur gears 78, one side of the gears 81, having formed upon them bevel gears 82 engageable with the bevel gears 79, the shafts 80 being mounted in brackets 85, pivotally engaged in the extending end of the brackets 76, so that the spur gears may be unmeshed and the bevel gears caused to mesh by rotating the brackets 85 upon their axis whereby the propellers 88 may be used in a horizontal position as shown in the full lines of Fig. 4, or turned vertically as indicated by the broken lines in the same figure. This movement of the brackets 85 is obtained by means of arms 90, pivotally engaged with the brackets at one end and by the pins 91 at the other to the face of a worm wheel 93, mounted upon a shaft 94 in the bracket 95, the worm wheel being turned by reason of its engagement with the worm 98 on the vertical shaft 99 provided with an operating hand wheel 100.

The laterally extended propellers when in horizontal position and when in operation have the effect of cutting up and destroying as much as possible the thrust of the descending air from the vertical lifting fans and thereby they tend to prevent the downward draft caused by such fans and the action results in maintaining the planes more uniform.

Obviously when the hand wheel 100 is turned, the propellers 88, without unmeshing of the gears, may be so rotated as to be extended horizontally outwardly at the sides of the casing or extended upward where they will act in connection with the propellers 32 in the manner of a helicopter, so as to raise the apparatus free from the ground or cause it to ascend a higher elevation as may be desired.

Having thus described my invention what I claim as new and desire to secure by Letters Patent, is:—

1. In a flying machine, the combination with tubular casing, and a power source carried thereby, of propellers engaged at the front and rear of said casing, a tail plane rotatable upon its central axis, means for operating said tail plane, connections between said power source and said propellers, a pair of vertically arranged propellers above said casing, connections between said vertical propellers and said power source, opposed pairs of laterally extending propellers, pivoted brackets upon which said propellers are rotatably mounted, means for turning said lateral propellers vertically, and connections between said lateral propellers and said power source whereby they may be operated either horizontally or vertically.

2. In a flying machine, the combination with tubular casing, and a power source carried thereby, of propellers engaged at the front and rear of said casing, a tail plane rotatable upon its central axis, means for operating said tail plane, connections between said power source and said propellers, a pair of vertically arranged propellers above said casing, connections between said vertical propellers and said power source, opposed pairs of laterally extending propellers, laterally extending shafts on the frame, means for driving said shafts, brackets pivotally held in operative relation to the laterally extending shafts, propeller shafts journaled in said brackets, propellers on the shafts, arms pivotally connected to the brackets, a rotary member to which the arms are pivotally connected, means for rotating the said rotary member, and gearing connecting the laterally extending shafts and propeller shafts having interengaging driving faces operative when the propeller shafts are in horizontal or in vertical positions.

In testimony whereof I have affixed my signature.

GEORGE FEDCHENKO.